United States Patent
Banerjee

(10) Patent No.: US 12,407,568 B2
(45) Date of Patent: Sep. 2, 2025

(54) DYNAMIC SWITCHING OF BLUETOOTH LE PHY FOR EXTENDED NON-CONNECTABLE ADVERTISEMENTS

(71) Applicant: FORD GLOBAL TECHNOLOGIES, LLC, Dearborn, MI (US)

(72) Inventor: Subharthi Banerjee, San Jose, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 314 days.

(21) Appl. No.: 18/069,434

(22) Filed: Dec. 21, 2022

(65) Prior Publication Data

US 2024/0214266 A1 Jun. 27, 2024

(51) Int. Cl.
*H04L 41/0816* (2022.01)
*H04L 12/40* (2006.01)
*H04L 12/66* (2006.01)

(52) U.S. Cl.
CPC .... *H04L 41/0816* (2013.01); *H04L 12/40006* (2013.01); *H04L 12/66* (2013.01); *H04L 2012/40273* (2013.01)

(58) Field of Classification Search
CPC ........... H04L 41/0816; H04L 12/40006; H04L 12/66; H04L 2012/40273
USPC ....................................................... 370/252
See application file for complete search history.

(56) References Cited

U.S. PATENT DOCUMENTS

| | | | |
|---|---|---|---|
| 8,761,133 B2 | 6/2014 | Wirola et al. | |
| 9,565,516 B2 | 2/2017 | Wang et al. | |
| 10,775,474 B2 | 9/2020 | Hong et al. | |
| 2022/0279324 A1* | 9/2022 | Mourad | H04L 1/203 |
| 2023/0171649 A1* | 6/2023 | Zopf | H04W 36/0027 370/331 |

OTHER PUBLICATIONS

Michael Spork et al., Performance and Trade-offs of the new PHY Modes of BLE 5, PERSIST-IoT '19: Proceedings of the ACM MobiHoc Workshop on Pervasive Systems in the IoT Era, pp. 7-12, Jul. 2019 (Year: 2019).*

* cited by examiner

*Primary Examiner* — Nicholas R Taylor
*Assistant Examiner* — Chong G Kim
(74) *Attorney, Agent, or Firm* — Joseph Zane; Brooks Kushman P.C.

(57) ABSTRACT

Dynamic switching of BLE PHY is provided. A host vehicle includes a transceiver configured to operate in a first mode in which the transceiver supports communications without forward error correction or in a second mode in which the transceiver provides forward error correction and enhanced non-line-of-sight (NLOS) performance with higher current usage than in the first mode. The host vehicle further includes a TCU, programmed to receive trigger parameters indicative of whether to dynamically switch the modes of the transceiver, responsive to first trigger conditions being met by the trigger parameters, transition the BLE PHY of the transceiver from the first mode to the second mode, and responsive to second trigger conditions being met by the trigger parameters, transition the BLE PHY of the transceiver from the second mode to the first mode.

19 Claims, 4 Drawing Sheets

DYNAMIC SWITCHING OF BLUETOOTH LE PHY FOR EXTENDED NON-CONNECTABLE ADVERTISEMENTS

TECHNICAL FIELD

Aspects of the disclosure generally relate to dynamic switching of Bluetooth Low Energy (BLE) physical layer (PHY) for extended non-connectable advertisements.

BACKGROUND

Vehicle-to-everything (V2X) allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure. In a vehicle telematics system, a telematics control unit (TCU) may be used for various remote-control services, such as over the air (OTA) software download, eCall, and turn-by-turn navigation.

SUMMARY

In one or more illustrative embodiments, a host vehicle for host vehicle for dynamic switching of BLE PHY is provided. The host vehicle includes a transceiver configured to operate in a first mode in which the transceiver supports communications without forward error correction or in a second mode in which the transceiver provides forward error correction and enhanced non-line-of-sight (NLOS) performance with higher current usage than in the first mode. The host vehicle further includes a TCU, programmed to receive trigger parameters indicative of whether to dynamically switch the modes of the transceiver, responsive to first trigger conditions being met by the trigger parameters, transition the BLE PHY of the transceiver from the first mode to the second mode, and responsive to second trigger conditions being met by the trigger parameters, transition the BLE PHY of the transceiver from the second mode to the first mode.

In one or more illustrative embodiments, a method for dynamic switching PHY configuration of a transceiver of a host vehicle, includes receiving, to a TCU of the host vehicle, trigger parameters indicative of whether to dynamically switch modes of the transceiver, the modes including a first mode in which the transceiver supports communications without forward error correction or in a second mode in which the transceiver provides forward error correction and enhanced non-line-of-sight (NLOS) performance with higher current usage than in the first mode; responsive to first trigger conditions being met by the trigger parameters, transitioning the PHY configuration of the transceiver, by the TCU, from the first mode to the second mode; and responsive to second trigger conditions being met by the trigger parameters, transitioning the PHY configuration of the transceiver, by the TCU, from the second mode to the first mode.

In one or more illustrative embodiments, a non-transitory computer-readable medium comprising instructions of a mode select application that, when executed by a processor of a TCU of a host vehicle, cause the TCU to perform operations including to receive, to the TCU, trigger parameters indicative of whether to dynamically switch modes of a transceiver of the host vehicle, the modes including a first mode in which the transceiver supports communications without forward error correction or in a second mode in which the transceiver provides forward error correction and enhanced non-line-of-sight (NLOS) performance with higher current usage than in the first mode; responsive to first trigger conditions being met by the trigger parameters, transition a PHY configuration of the transceiver, by the TCU, from the first mode to the second mode; and responsive to second trigger conditions being met by the trigger parameters, transition the PHY configuration of the transceiver, by the TCU, from the second mode to the first mode.

DETAILED DESCRIPTION

Figure 1:
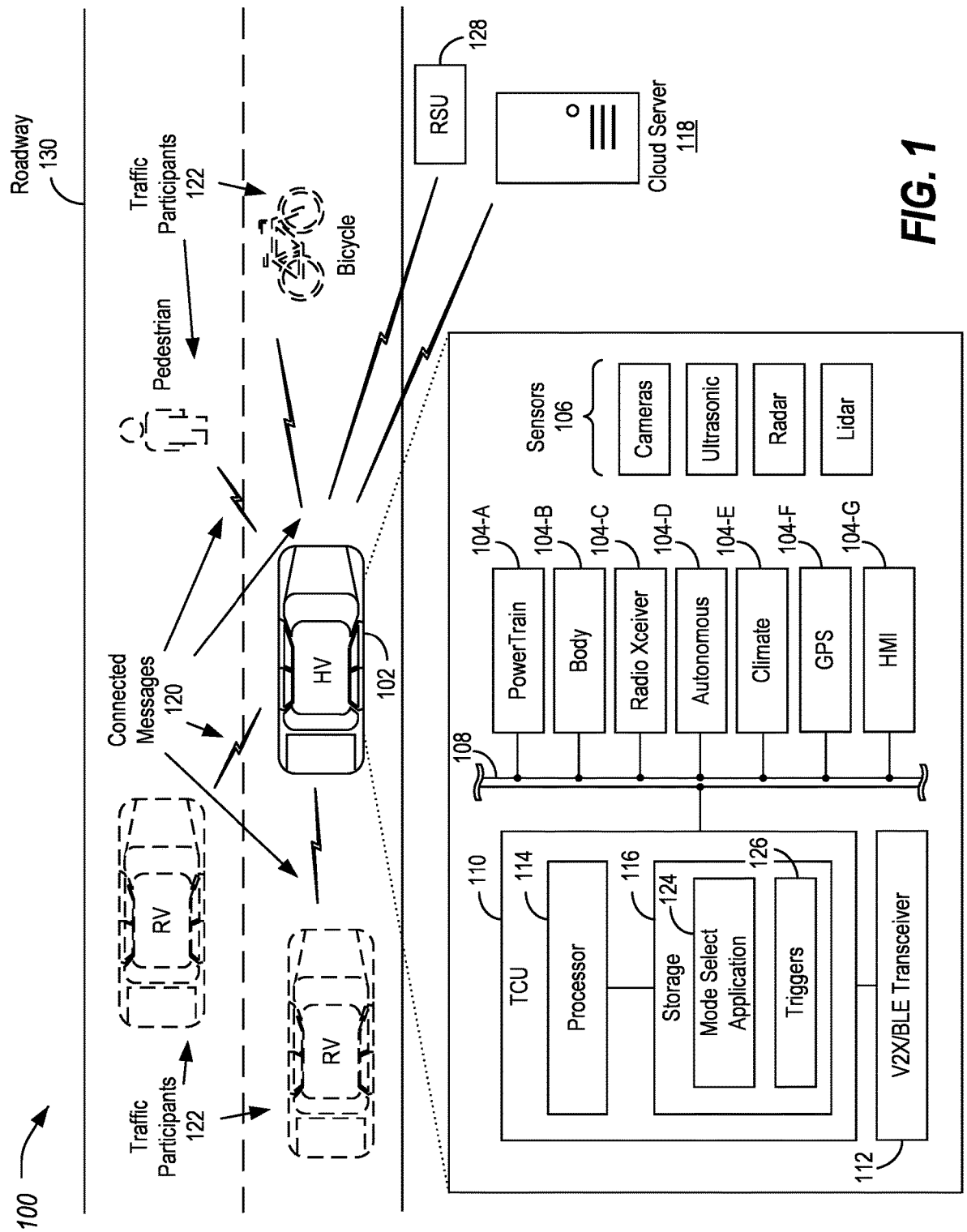
FIG. 1 illustrates an example system for performing dynamic switching of BLE PHY for extended non-connectable advertisements.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In recent years, network-based event dissemination and map integration for a multitude of events has become prevalent. For example, some navigation systems integrate vehicle stops, road obstacles, railroad crossings, work-zones, etc. along with community driven information sharing and databases managed by different state or federal departments. Though this information is invaluable to the motorists for global route planning, local route planning may still be complex with the dynamicity of the events themselves. For example, a work-zone may define a location but also aspects of a scenario occurring at the location, such as whether workers are present, if present where in the work-zone they are located, whether there are workers in unusual or difficult positions, etc. Other locations may additionally include scenario information, such as railroad crossings, which may define aspects of a scenario such as whether a train is coming, whether there are drivers or passenger outside of the stopped vehicle on the interstate etc.

Cellular vehicle-to-everything (C-V2X) periodic broadcasts may be used to inform traffic participants of locations and scenarios that relate to those locations. However, cellular systems may involve high latency, which may reduce the utility of providing real-time scenario information. In another example, Wi-Fi may be utilized. However, Wi-Fi may involve higher power utilization for long-distance communication to be viable.

Traditional BLE PHY (supported by BLE 4.x) LE1M may support simultaneous receive from multiple devices with acceptable performance in congestion situations. BLE 5.x may also offer LE125K PHY options, which use Forward Error Correction (FEC), which provides enhanced mobility and NLOS performance, with the tradeoff of significantly higher current compared to traditional PHY LE1M. In some situations (e.g., urban outdoor scenarios) it may be desirable to utilize LE1M, while in others it may be preferable to utilize LE125K (e.g., interstate scenarios).

If a BLE PHY is utilized in urban outdoor applications to periodically broadcast, one-way communications, it may not be possible to switch the PHY to another physical layer on the fly. This may be because both transmitter and receiver functions of the BLE PHY may be required be utilizing the same protocol. Additionally, BLE 5.0 based beaconing may require adaptive switching in interstates to accommodate mobility and long-distance use-cases. Currently, BLE 5.0 based beaconing may be pre-programmed for a particular application. Due to the absence of handshaking between transmitter and receiver, an uncoordinated change in PHY may lead to missed packets and degradation of communication performance.

In an enhanced approach, trigger parameters such as location and speed may be used to trigger a BLE PHY of a TCU to transition between LE1M and LE125K. For example, if BLE is being used to receive PSMs from pedestrian or bicyclists, one might not expect huge number of pedestrian or bicyclist to be present in the interstates or highways (bicycles are not allowed on the interstates). Therefore, in an interstate or close to a work-zone, the TCU may switch the BLE PHY from LE1M to LE125K to receive long-range messages at higher speeds. Distances greater than line-of-sight (LOS), such as 750 m at >60 mph may be practical with LE125K but may not be possible for LE1M. The TCU may be configured to switch back to use of LE1M responsive to the vehicle transitioning LE1M use cases, such as urban, congested environments or intersection approaches. Significantly, these trigger conditions are wireless parameter independent. For example, received signal strength indicator (RSSI) is not used as a trigger to switch between modes.

Additionally, it should be noted that the transmitter and receiver need to be operating in the same physical layer. This may require, for example, that operators in work-zones to be transmitting in LE125K, whole pedestrians may be utilizing LE1M. Because the trigger approach is location or environment based, both transmitter and receiver can be assumed to be operating with the same PHY, guaranteeing reliability for one-way communications or beacons.

FIG. 1 illustrates an example system 100 for performing dynamic switching of BLE PHY for extended non-connectable advertisements. A vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received V2X data. The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a global positioning system (GPS) controller 104F may be configured to provide vehicle location information; and a human-machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver assistance system (ADAS) cameras), ultrasonic sensors, radar systems, and/or lidar systems.

A vehicle bus 108 may include various methods of communication available between the vehicle controllers 104, as well as between a TCU 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a transceiver 112 configured to facilitate communication with other vehicles 102 or with infrastructure. The transceiver 112 may include BLE functionality, such as support for operation via LE1M and LE125K. The TCU 110 may be further configured to communicate over various other protocols, such as with a communication network over a network protocol (such as Uu). The TCU 110 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc.

The TCU 110 may be configured to include one or more interfaces from which vehicle information may be sent and received. This information can be sensed, recorded, and sent to a cloud server 118. In an example, the cloud server 118 may also include one or more processors (not shown) configured to execute computer instructions, and a storage medium (not shown) on which the computer-executable instructions and/or data may be maintained.

The TCU 110 may be configured to facilitate the collection of connected vehicle data and/or other vehicle information from the vehicle controllers 104 connected to the one or more vehicle buses 108. While a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit connected messages 120 for reception by other vehicles 102. The position, dimension and heading of a vehicle 102 may be broadcast by the vehicle 102 in the in the connected messages 120. In an example, the frequency of sending the connected messages 120 may be on the order of every ten milliseconds. A V2X radio may be a relatively short-range communications unit (e.g., with a range on the order of one kilometer). In an example, the V2X radio may operate on Cellular V2X (e.g., C-V2X 3GPP). In another example, the V2X radio may operate on Institute of Electrical and Electronics Engineer (IEEE) 802.11p Dedicated Short Range Communication (DSRC). In one example, the connected messages 120 may take the form of BSM messages as described in the society of automotive engineers (SAE) standard document J2735.

The TCU 110 may be further configured to receive connected messages 120 from other vehicles 102 or other traffic participants 122. In an example, the vehicle 102 may be referred to as a host vehicle (HV) and remote vehicles (RV) surrounding the HV may be in communication with the vehicle 102 as traffic participants 122. In another example, the HV may be in communication with other traffic participants 122, such as bicyclists, pedestrians, etc.

The connected messages 120 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, latitude, longitude, time, heading angle, speed, lateral changes in speed, longitudinal changes in speed, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, antilock brake system (ABS) system status, etc.).

To allow for the communication of connected message 120, the transceiver 112 may be configured by the TCU 110 to operate in a mode corresponding to the BLE PHY mode of the traffic participants 122. For instance, when the TCU 110 is intending to communication with pedestrians or bicyclists, the TCU 110 may configure the transceiver 112 to operate in LE1M mode. Or, when the TCU 110 is intending to communication with vehicles 102 on a highway, the TCU 110 may configure the transceiver 112 to operate in LE125K mode. The management of the mode of the transceiver 112, as well as the sending and receiving of connected vehicle data may be handled by a mode select application 124 executed by the TCU 110.

The TCU 110 may be configured to utilize various trigger conditions 126 to determine whether to dynamically switch the mode of the transceiver 112. In an example, responsive to first trigger conditions 126 being met, the TCU 110 may dynamically transition the transceiver 112 from a first mode to a second mode. In another example, responsive to second trigger conditions 126 being met, the TCU 110 may dynamically transition the transceiver 112 from the second mode to the first mode. The first mode may be LE1M mode, while the second mode may be LE125K mode. Further aspects of the operation of the mode select application 124 to transition the state of the transceiver 112 based on the trigger conditions 126 are discussed in detail below.

In some examples the traffic participants 122 may additionally involve communication via one or more roadside units (RSUs) 128. The RSU 128 may be a device with processing capabilities and networking capabilities and may be designed to be placed in proximity of a roadway 130 for use in communicating with the vehicles 102. In an example, the RSU 128 may include hardware configured to communicate over the broadcast peer-to-peer protocol (such as PC5), to facilitate C-V2X communications with the vehicles 102. The RSU 128 may, accordingly, be able to communicate with multiple vehicles 102 along a specific roadway 130 or in a specific area. The RSU 128 may also have wired or wireless backhaul capability to allow for communication with other elements of a traffic control system, via e.g., Ethernet, or cellular connection to the cellular network infrastructure, for example over Uu interface.

Figure 2:
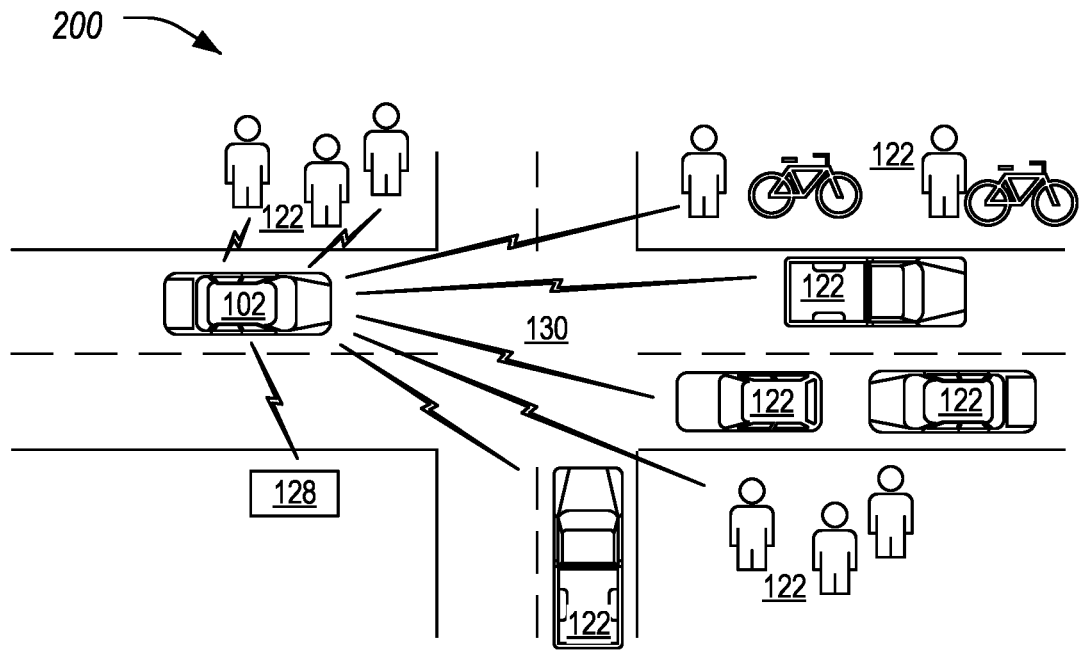
FIG. 2 illustrates an example of an urban traffic scenario.

FIG. 2 illustrates an example of an urban traffic scenario 200. In the urban traffic scenario 200, the vehicle 102 may also be in communication with various other traffic participants 122. Here, the other traffic participants 122 include a plurality of RVs traversing the roadway 130, as well as other types of traffic participants 122 such as pedestrians, bicyclists, a RSU 128, etc. In such an urban traffic scenario 200, it may be desirable for the TCU 110 configure the transceiver 112 to operate in LE1M mode.

Figure 3:
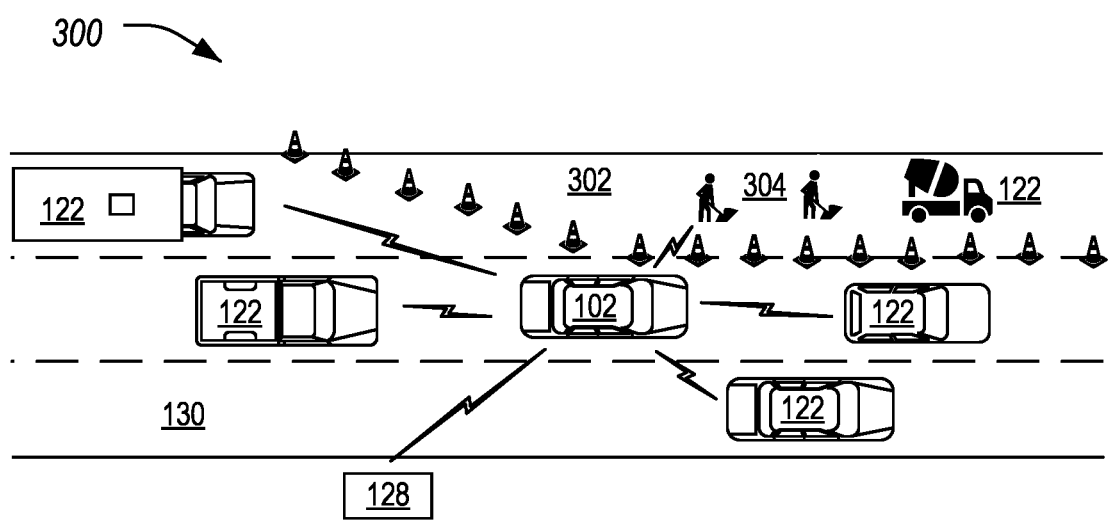
FIG. 3 illustrates an example of a highway traffic scenario.

FIG. 3 illustrates an example of a highway traffic scenario 300. In the highway traffic scenario 300, the vehicle 102 may be in communication with various other traffic participants 122. Here, the other traffic participants 122 include a plurality of RVs traversing the roadway 130 in the same travel direction as the vehicle 102. Additionally, a work zone 302 is located along the roadway 130, in which workers 304 and/or other construction traffic participants 122 may be blocking a portion of the roadway 130. In such a highway traffic scenario 300, it may be desirable for the TCU 110 configure the transceiver 112 to operate in LE125K mode.

Figure 4:
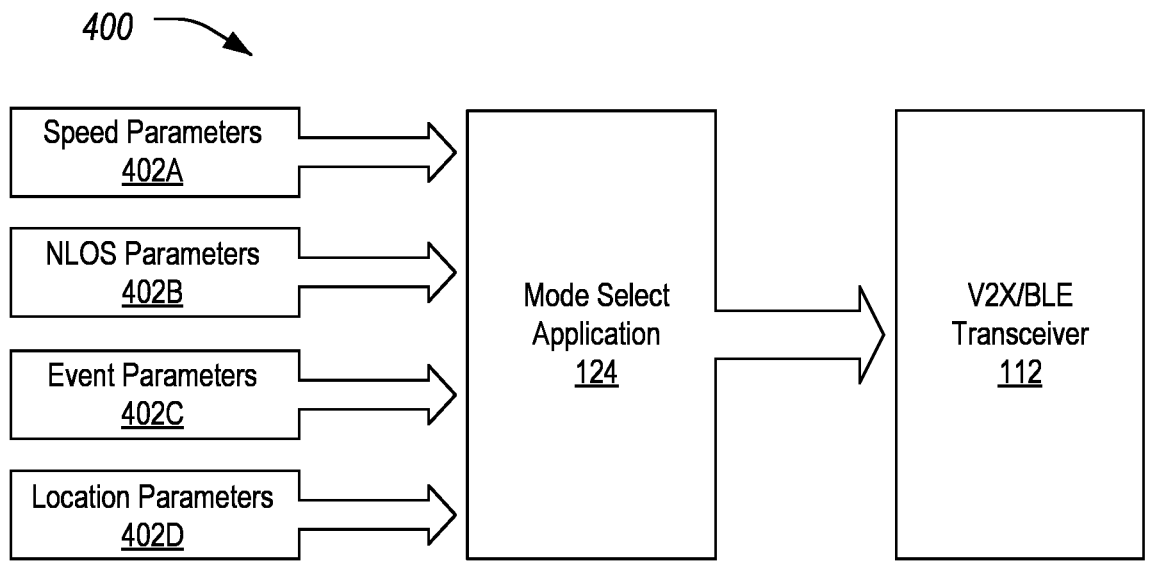
FIG. 4 illustrates an example data flow for operation of the mode select application in the context of the system.

FIG. 4 illustrates an example data flow 400 for operation of the mode select application 124 in the context of the system 100. As shown, the mode select application 124 may receive trigger parameters 402. These parameters may include, as some examples, speed parameters 402A, NLOS participant presence parameters 402B, external event parameters 402C, and vehicle location parameters 402D. Based on the parameters, the mode select application 124 may select the operational mode of the transceiver 112.

The speed parameter 402A may include information indicative of the current velocity of the vehicle 102. This information may be received to the mode select application 124 via communication by the TCU 110 with the vehicle bus 108. For instance, the speed may be used to determine whether the vehicle 102 is traveling in a urban traffic scenario 200 or in a highway traffic scenario 300. In some examples, additional information such as vehicle location parameters 402D (discussed more below) may be used to confirm that the vehicle 102 is located within a urban traffic scenario 200 or in a highway traffic scenario 300.

The NLOS participant presence parameters 402B may include information indicative of whether non-line of sight traffic participants 122 are indicated. For instance, this may be determined by reception of connected messages 120 by the transceiver 112, where the connected messages 120 include locations of the traffic participant 122 that are within a predefined distance from the vehicle 102 but there are circumstances that indicate NLOS. In a specific example, the predefined distance may be approximately 30 meters. For instance, while the connected messages 120 are from a close sender, the traffic participants 122 may not be observed via a camera sensor 106 of the vehicle 102. Because these connected messages 120 are received, but the sender is not located, the vehicle 102 may raise a NLOS situation for a dynamic PHY switch. Or there may be a packet loss rate (PER) greater than a defined threshold (e.g., 70%) that may indicate a NLOS condition for a dynamic PHY switch.

The external event parameters 402C may include information received to the vehicle 102 from a cloud server 118, mobile edge computing (MEC) device, RSU 128, or other external source. For instance, the external event parameters 402C may include receipt of an indication of a location of a work zone 302 along the roadway 130. Or the external event parameters 402C may include receipt of an indication of an object blocking the road. The external event parameters 402C may be received to the vehicle 102 over various protocols, such as network-to-vehicle (N2V), LTE-Uu, NR-Uu, etc. If such a region of interest (ROI) is identified within the proximity of the vehicle 102 (e.g., within 500 meters), then an external event condition may be raised for a dynamic PHY switch.

The vehicle location parameters 402D may include information indicative of the current location of the vehicle 102. This information may be received to the mode select application 124 via communication by the TCU 110 with the vehicle bus 108. For instance, this location may be identified using global navigation satellite system (GNSS) functionality of the vehicle 102. The vehicle 102 may compare the present location of the vehicle 102 to map locations of triggers. (In other examples, the vehicle 102 may further utilize speed parameters 402A and heading of the vehicle 102, in addition to vehicle location parameters 402D). For instance, the vehicle 102 may receive map data from a cloud server 118 indicative of locations of interstates, railroad crossings, work zones 302, etc. Or the vehicle 102 may maintain such map data locally, such as in a storage of the TCU 110 or otherwise within the vehicle 102 and in communication with the TCU 110. If the vehicle 102 being present at such a location is detected, then that may indicate a location condition for a dynamic PHY switch.

In another example, the vehicle location parameters 402D may be determined in part based on information received from the RSU 128. For instance, if the RSU 128 is broadcasting map or intersection information messages that relate to an urban intersection, then this information may be received to the vehicle 102 and used to infer that the vehicle 102 is in an urban traffic scenario 200. In another example, if the RSU 128 is broadcasting map or tolling messages that relate to a highway, then this information may be received to the vehicle 102 and used to infer that the vehicle 102 is in a highway traffic scenario 300

Figure 5:
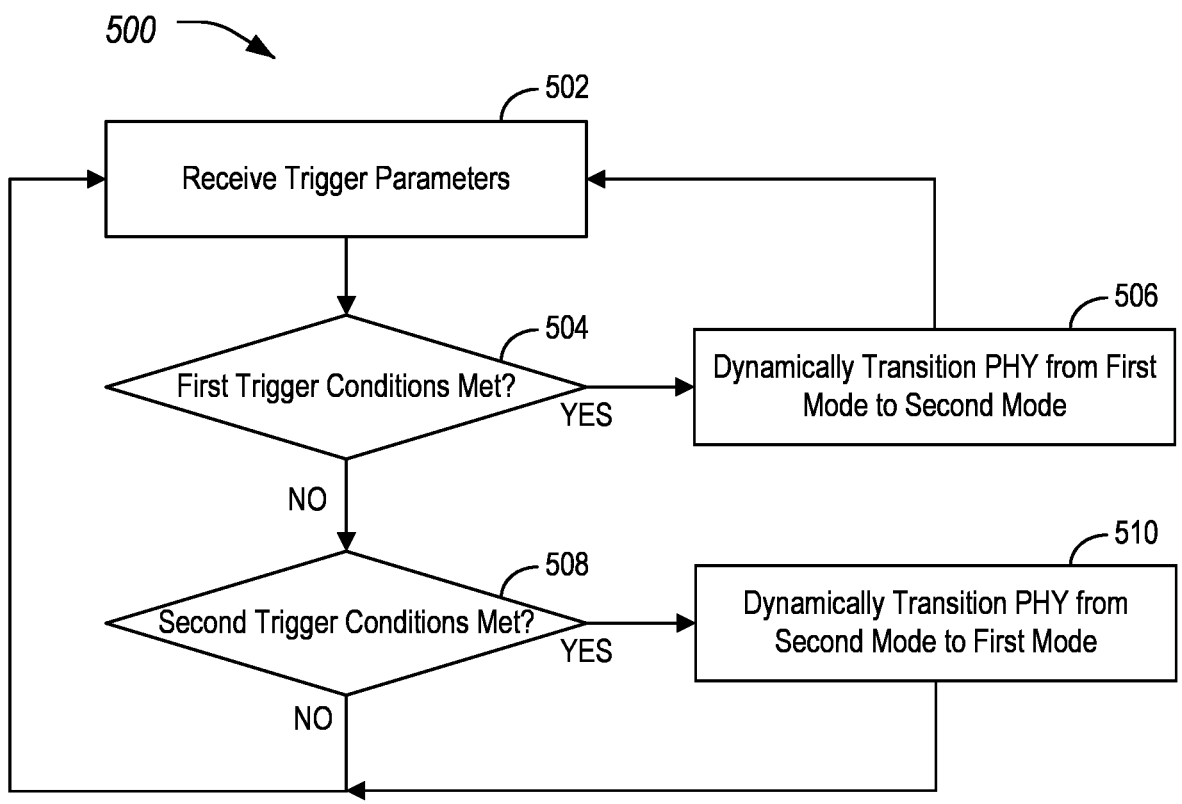
FIG. 5 illustrates an example process for operation of the mode select application in the context of the system.

FIG. 5 illustrates an example process 500 for operation of the mode select application 124 in the context of the system 100. In an example, the process 500 may be performed by the mode select application 124 of the TCU 110, in the context of the system 100 and data flow 400.

At operation 502, the vehicle 102 receives trigger parameters 402. For example, these trigger parameters 402 may include one or more of speed parameters 402A, NLOS participant presence parameters 402B, external event parameters 402C, and/or vehicle location parameters 402D. These parameters may be received to the mode select application 124 from various sources. For instance, speed, heading, and location may be received to the TCU 110 from sensors 106 or controllers 104 via the vehicle bus 108. In another example, information with respect to the speed, heading, location, type, and other aspects of the traffic participants 122 may be received via connected messages 120 to the TCU 110. In yet another example, map, ROI, and/or event information may be received from cloud servers 118 and/or local database storages of the vehicle 102.

At operation 504, the vehicle 102 determines whether a first trigger condition 126 is met. In an example, various trigger conditions 126 may be used to determine whether to dynamically switch the mode of the transceiver 112. In some circumstances, it may be desirable for the transceiver 112 to operate in a first mode, while in other circumstances it may be desirable for the transceiver 112 to operate in a second mode. The first trigger conditions 126 include those conditions that, when met according to the trigger parameters 402, suggest that the vehicle 102 should operate in the second mode, rather than the first mode.

The first trigger condition 126 may include trigger conditions 126 indicative of a highway traffic scenario 300, for example. Examples of such trigger conditions 126 may include one or more of: speed parameters 402A of the vehicle 102 exceeding a predefined threshold speed (e.g., 55 miles per hour (MPH)), speed parameters 402A of traffic participants 122 exceeding the predefined threshold speed, the vehicle 102 and the traffic participants 122 heading in the same direction above the predefined threshold speed, NLOS participant presence parameters 402B not indicating NLOS conditions, observance of highway work zones 302 according to connected messages 120 or sensors 106, map data indicating the vehicle location parameters 402D are indicative of the vehicle 102 being in a highway traffic scenario 300, etc. Other example trigger conditions 126 may include determining, based on the type of sender of the connected messages 120, that the connected messages 120 are not being sent by pedestrians, bicyclists, or other types of traffic participants 122 that may be found in an urban traffic scenario 200.

If, operation 504, the first trigger condition 126 is met, the vehicle 102 to proceed to operation 506 to dynamically transition the transceiver 112 from a first mode to a second mode. For instance, the first mode may be LE1M, in an example, while the second mode may be LE125K, and the mode select application 124 may direct the TCU 110 to cause the transceiver 112 to transition to utilizing LE125K instead of LE1M. (If the PHY of the transceiver 112 is already in the second mode, then no transition may be required to be performed.) After operation 506, control returns to operation 502. If, at operation 504, the first trigger condition 126 is not met, control passes to operation 508.

At operation 508, the vehicle 102 determines whether a second trigger condition 126 is met. The second trigger conditions 126 include those conditions that, when met according to the trigger parameters 402, suggest that the vehicle 102 should operate in the first mode, rather than the second mode. In one example, the second trigger conditions 126 may simply be the absence of occurrence of the first trigger conditions 126. In other examples, the second trigger conditions 126 may include different conditions to be affirmatively met in order to transition the transceiver 112 from the second mode to the first mode.

Examples of such trigger conditions 126 may include one or more of: speed parameters 402A of the vehicle 102 being less than a predefined threshold speed (e.g., 55 MPH), speed parameters 402A of traffic participants 122 being less than the predefined threshold speed, the vehicle 102 and the traffic participants 122 heading in varied directions below the predefined threshold speed, NLOS participant presence parameters 402B indicating present of NLOS traffic participants 122, lack of observance of highway situations according to connected messages 120 or sensors 106, map data indicating the vehicle location parameters 402D are indicative of the vehicle 102 being in an urban traffic scenario 200, etc. Other example trigger conditions 126 may include determining, based on the type of sender of the connected messages 120, that the connected messages 120 are being sent by pedestrians, bicyclists, or other types of traffic participants 122 that may be found in an urban traffic scenario 200.

If, operation 508, the second trigger condition 126 is met, the vehicle 102 to proceed to operation 510 to dynamically transition the transceiver 112 from the second mode to the first mode. (If the PHY of the transceiver 112 is already in the first mode, then no transition may be required to be performed.) After operation 510, control returns to operation 502. If, at operation 508, the second trigger condition 126 is not met, control passes to operation 502.

Thus, by utilizing these trigger conditions 126 and trigger parameters 402, the TCU 110 may switch dynamically between LE1M and LE125K in terms of Bluetooth PHY. In doing so, the TCU 110 may enhance selection of the mode of the Bluetooth PHY, thereby also enhancing Bluetooth reception performance in outdoor and mobile environments.

Figure 6:
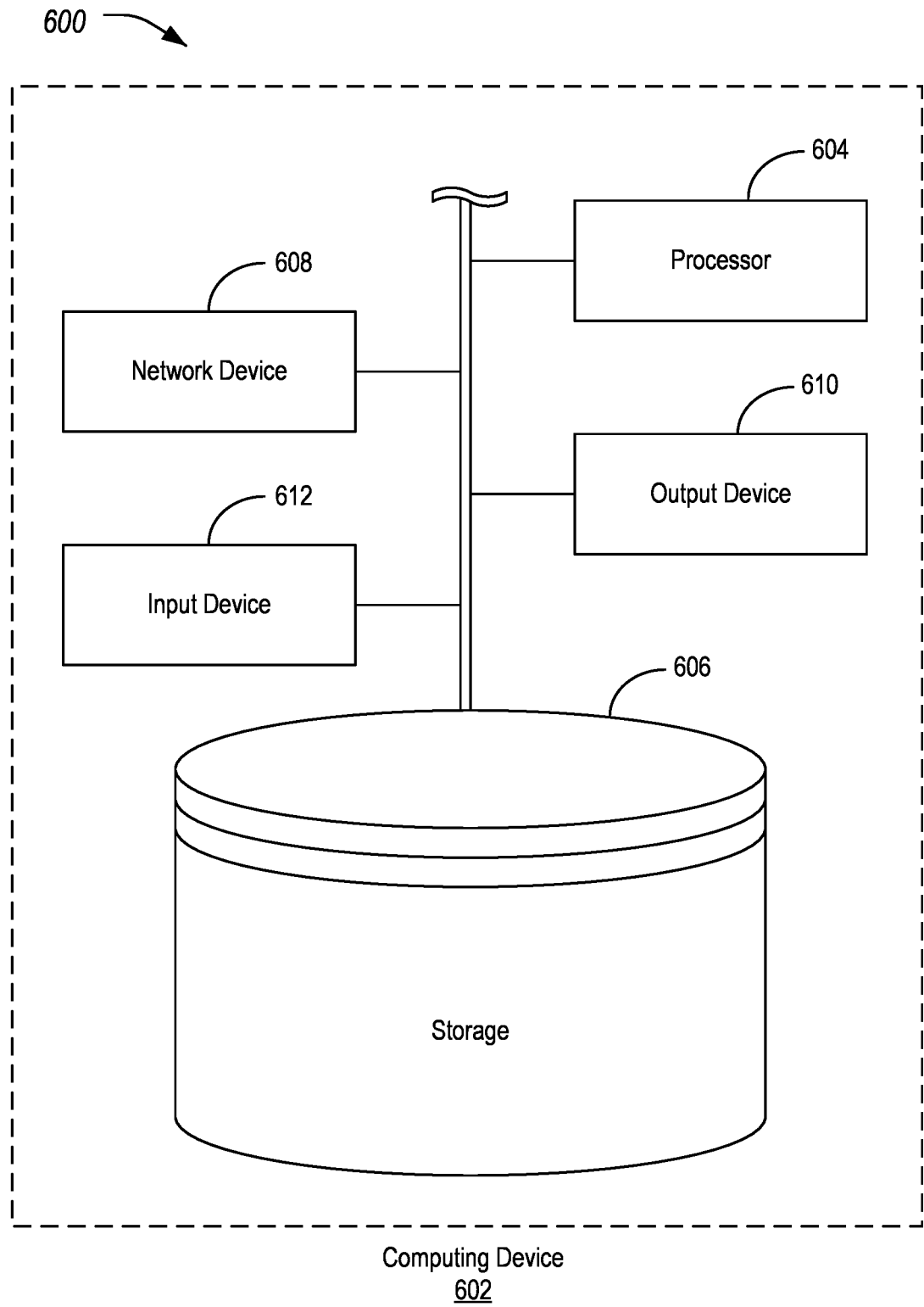
FIG. 6 illustrates an example of a computing device for use in the dynamic switching of BLE PHY for extended non-connectable advertisements.

FIG. 6 illustrates an example 600 of a computing device 602 for use in the dynamic switching of BLE PHY for extended non-connectable advertisements. Referring to FIG. 6, and with reference to FIGS. 1-5, the vehicles 102, controllers 104, TCU 110, transceivers 112, processors 114, traffic participants 122, and RSUs 128 may be examples of such computing devices 602. As shown, the computing device 602 includes a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 604 executes stored program instructions that are retrieved from the storage 606, such as those of the mode select application 124. The stored program instructions, accordingly, include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100. Examples of data stored to the storage 606 may include connected messages 120, trigger conditions 126, and trigger parameters 402.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the vehicles 102, traffic participants 122, and cloud server 118 to send and/or receive data from external devices over networks. Examples of suitable network devices 608 include an Ethernet interface, a Wi-Fi transceiver, a cellular transceiver, or a BLUETOOTH or BLE transceiver, an ultra wideband (UWB) transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A host vehicle for dynamic switching physical layer (PHY) configuration, comprising:
   a transceiver configured to operate in a plurality of modes, the plurality of modes including a first mode in which the transceiver supports communications without forward error correction and or in a second mode in which the transceiver provides forward error correction and enhanced non-line-of-sight (NLOS) performance with higher current usage than in the first mode; and
a telematics control unit (TCU), programmed to
receive trigger parameters indicative of whether to dynamically switch between the plurality of modes of the transceiver, including information indicative of speed of the host vehicle,
responsive to first trigger conditions being met by the trigger parameters, the first trigger conditions including the speed of the host vehicle exceeding a predefined threshold speed indicative of highway driving, transition the PHY configuration of the transceiver from the first mode to the second mode, and
responsive to second trigger conditions being met by the trigger parameters, the second trigger conditions including the speed of the host vehicle not exceeding the predefined threshold speed, transition the PHY configuration of the transceiver from the second mode to the first mode.

2. The host vehicle of claim 1, wherein the first mode is BLUETOOTH Low Energy 1 Mbps PHY mode (LE1M), and the second mode is BLUETOOTH Low Energy Coded PHY 125 kbps (kilobits per second) data rate mode (LE125K).

3. The host vehicle of claim 1, wherein the first trigger conditions are indicative of the host vehicle traveling a highway traffic scenario, and the second trigger conditions are indicative of the host vehicle traveling an urban traffic scenario.

4. The host vehicle of claim 1, wherein the TCU is configured to receive in connected messages received to the transceiver, information indicative of speed of traffic participants other than the host vehicle, the first trigger conditions further include the speed of the traffic participants exceeding the predefined threshold speed, and the second trigger conditions include the speed of traffic participants other than the host vehicle not exceeding the predefined threshold speed.

5. The host vehicle of claim 1, wherein the TCU is configured to receive in connected messages received to the transceiver, information indicative of direction of travel of traffic participants other than the host vehicle, the first trigger conditions further include the direction of travel of the traffic participants being in the direction of travel of the host vehicle, and the second trigger conditions include the direction of travel of the traffic participants not being in the direction of travel of the host vehicle.

6. The host vehicle of claim 1, wherein the TCU is configured to receive in connected messages received to the transceiver, information indicative of locations of traffic participants other than the host vehicle, the first trigger conditions further include the locations of the traffic participants not being confirmed by sensors of the host vehicle, and the second trigger conditions further include the locations of the traffic participants being confirmed by the sensors of the host vehicle.

7. The host vehicle of claim 1, wherein the first trigger conditions include observance, via connected messages received to the TCU or according to sensors of the host vehicle, of highway work zones in proximity to the host vehicle, and the second trigger conditions include lack of observance of the highway work zones in the proximity to the host vehicle.

8. The host vehicle of claim 1, wherein the first trigger conditions include a current location of the host vehicle being indicated by map data as traversing a highway, and the second trigger conditions include the current location of the host vehicle being indicated by the map data as traversing an urban roadway.

9. The host vehicle of claim 1, wherein the TCU is configured to receive in connected messages received to the transceiver, information indicative of classes of sender of the connected messages, the first trigger conditions further include the classes not including urban types of traffic participants, and the second trigger conditions further include the classes including the urban types of traffic participants.

10. A method for dynamic switching physical layer (PHY) configuration of a transceiver of a host vehicle, comprising:
receiving, to a telematics control unit (TCU) of the host vehicle, trigger parameters indicative of whether to dynamically switch modes of the transceiver, the modes including a first mode in which the transceiver supports communications without forward error correction or in a second mode in which the transceiver provides forward error correction and enhanced non-line-of-sight (NLOS) performance with higher current usage than in the first mode, the trigger parameters including information indicative of speed of the host vehicle;
responsive to first trigger conditions being met by the trigger parameters, the first trigger conditions including the speed of the host vehicle exceeding a predefined threshold speed indicative of highway driving, transitioning the PHY configuration of the transceiver, by the TCU, from the first mode to the second mode; and
responsive to second trigger conditions being met by the trigger parameters, the second trigger conditions including the speed of the host vehicle not exceeding the predefined threshold speed, transitioning the PHY configuration of the transceiver, by the TCU, from the second mode to the first mode.

11. The method of claim 10, wherein the first mode is BLUETOOTH Low Energy 1 Mbps PHY mode (LE1M), and the second mode is BLUETOOTH Low Energy Coded PHY 125 kbps (kilobits per second) data rate mode (LE125K).

12. The method of claim 10, wherein the first trigger conditions are indicative of the host vehicle traveling a highway traffic scenario, and the second trigger conditions are indicative of the host vehicle traveling an urban traffic scenario.

13. The method of claim 10, further comprising receiving in connected messages received to the transceiver, information indicative of speed of traffic participants other than the host vehicle, wherein the first trigger conditions further include the speed of the traffic participants exceeding the predefined threshold speed, and the second trigger conditions include the speed of traffic participants other than the host vehicle not exceeding the predefined threshold speed.

14. The method of claim 10, further comprising receiving, to the TCU, in connected messages received to the transceiver, information indicative of direction of travel of traffic participants other than the host vehicle, wherein the first trigger conditions further include the direction of travel of the traffic participants being in the direction of travel of the host vehicle, and the second trigger conditions include the direction of travel of the traffic participants not being in the direction of travel of the host vehicle.

15. The method of claim 10, further comprising receiving, to the TCU, in connected messages received to the transceiver, information indicative of locations of traffic participants other than the host vehicle, wherein the first trigger conditions further include the locations of the traffic participants not being confirmed by sensors of the host vehicle, and the second trigger conditions further include the locations of the traffic participants being confirmed by the sensors of the host vehicle.

16. The method of claim 10, wherein the first trigger conditions include observance, via connected messages received to the TCU or according to sensors of the host vehicle, of highway work zones in proximity to the host vehicle, and the second trigger conditions include lack of observance of the highway work zones in the proximity to the host vehicle.

17. The method of claim 10, wherein the first trigger conditions include a current location of the host vehicle being indicated by map data as traversing a highway, and the second trigger conditions include the current location of the host vehicle being indicated by the map data as traversing an urban roadway.

18. The method of claim 10, further comprising receiving, to the TCU, in connected messages received to the transceiver, information indicative of classes of sender of the connected messages, wherein the first trigger conditions further include the classes not including urban types of traffic participants, and the second trigger conditions further include the classes including the urban types of traffic participants.

19. A non-transitory computer-readable medium comprising instructions of a mode select application that, when executed by a processor of a telematics control unit (TCU) of a host vehicle, cause the TCU to perform operations including to:

receive, to the TCU, trigger parameters indicative of whether to dynamically switch modes of a transceiver of the host vehicle, the modes including a first mode in which the transceiver supports communications without forward error correction or in a second mode in which the transceiver provides forward error correction and enhanced non-line-of-sight (NLOS) performance with higher current usage than in the first mode, the trigger parameters including information indicative of speed of the host vehicle;

responsive to first trigger conditions being met by the trigger parameters, the first trigger conditions including the speed of the host vehicle exceeding a predefined threshold speed indicative of highway driving, transition a physical layer (PHY) configuration of the transceiver, by the TCU, from the first mode to the second mode; and responsive to second trigger conditions being met by the trigger parameters, the second trigger conditions including the speed of the host vehicle not exceeding the predefined threshold speed, transition the PHY configuration of the transceiver, by the TCU, from the second mode to the first mode.

* * * * *